(12) United States Patent
Yoshida et al.

(10) Patent No.: US 9,638,284 B2
(45) Date of Patent: May 2, 2017

(54) WEAR-RESISTANT CHAIN PIN

(71) Applicant: BorgWarner Inc., Auburn Hills, MI (US)

(72) Inventors: Yukio Yoshida, Yabata (JP); Yasushi Miyazaki, Yabata (JP)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/772,104

(22) PCT Filed: Mar. 12, 2014

(86) PCT No.: PCT/US2014/023837
§ 371 (c)(1),
(2) Date: Sep. 2, 2015

(87) PCT Pub. No.: WO2014/159475
PCT Pub. Date: Oct. 2, 2014

(65) Prior Publication Data
US 2016/0003324 A1    Jan. 7, 2016

(30) Foreign Application Priority Data

Mar. 14, 2013  (JP) ................................. 2013-051306

(51) Int. Cl.
*F16G 13/04*    (2006.01)
*F16G 15/12*    (2006.01)
(Continued)

(52) U.S. Cl.
CPC ................ *F16G 15/12* (2013.01); *C23C 8/72* (2013.01); *C23C 12/02* (2013.01); *F16G 13/00* (2013.01);
(Continued)

(58) Field of Classification Search
CPC .......... F16G 13/00; F16G 13/02; F16G 13/04; F16G 13/18; F16G 15/12; C23C 8/72; C23C 148/227
(Continued)

(56) References Cited

U.S. PATENT DOCUMENTS 6,068,568 A     5/2000  Kozakura et al.
6,582,765 B2 *  6/2003  Wang ..................... C23C 12/02
                                                    427/216
(Continued)

FOREIGN PATENT DOCUMENTS

JP           56006939 A       1/1981

OTHER PUBLICATIONS

International Search Report and Written Opinion dated Jun. 25, 2014; International Application No. PCT/US2014/023837; 9 pages.

*Primary Examiner* — David B Jones
(74) *Attorney, Agent, or Firm* — BrooksGroup

(57) ABSTRACT

Problem. To provide a chain pin which makes it possible to improve wear resistance even in an environment in which degraded oil is used. Solution. A large number of pins are mixed/agitated together with a particle mixture including a penetrant comprising chromium (Cr) powder and tungsten carbide (WC) powder, and an iron chloride ($FeCl_3$) catalyst, and WC particles penetrate the surface of the pins together with chromium carbide (CrC). As a result, a chromium carbide layer in which WC particles are diffused in a CrC layer (CrC—WC layer) is formed on the outermost surface part of the steel forming the parent material of the pins.

2 Claims, 6 Drawing Sheets

(51) Int. Cl.
　　　*F16G 13/00*　　　(2006.01)
　　　*F16G 13/02*　　　(2006.01)
　　　*F16G 13/08*　　　(2006.01)
　　　*C23C 8/72*　　　(2006.01)
　　　*F16G 13/18*　　　(2006.01)
　　　*C23C 12/02*　　　(2006.01)

(52) U.S. Cl.
　　　CPC .............. *F16G 13/02* (2013.01); *F16G 13/04* (2013.01); *F16G 13/08* (2013.01); *F16G 13/18* (2013.01)

(58) Field of Classification Search
　　　USPC .......................................................... 59/84
　　　See application file for complete search history.

(56) References Cited

U.S. PATENT DOCUMENTS

| | | | |
|---|---|---|---|
| 7,695,575 B2* | 4/2010 | Okumura | C23C 10/08 |
| | | | 148/227 |
| 2002/0031687 A1 | 3/2002 | Wang et al. | |
| 2002/0119852 A1* | 8/2002 | Tada | F16G 13/02 |
| | | | 474/212 |
| 2003/0176252 A1 | 9/2003 | Tsujit et al. | |
| 2006/0269763 A1* | 11/2006 | Nakano | F16G 13/00 |
| | | | 428/457 |
| 2015/0211603 A1* | 7/2015 | Koschig | F16G 13/04 |
| | | | 474/229 |

* cited by examiner

Sprocket:       23ᵀ × 23ᵀ
Rotation:       6,500 rpm
Lubricant:      TBN = 1
Oil Temperature: 100 °C
Oil Amount:     1.0 L / min

WEAR-RESISTANT CHAIN PIN

TECHNICAL FIELD

The present invention relates to a chain pin which has improved wear resistance even in an environment in which degraded oil is used.

PRIOR ART

A large number of links are endlessly joined by way of pins in a power transmission chain such as a silent chain or a roller chain, or a primary drive chain, and the pins are worn as a result of the links rotating and sliding about said pins while the chain is running. Various methods have therefore been proposed in the prior art in order to improve the wear resistance of the pins.

In JP 56-41370 A, for example, the pin material is subjected to a chromizing treatment, whereby a hardened layer comprising chromium carbide is formed on the surface of the pin material. Furthermore, in JP 10-169723 A, a hardened layer comprising at least one carbide from among chromium, titanium, vanadium, and niobium is formed on the surface of a pin material.

Repeated wear resistance tests were carried out on pins in which a chromium carbide (CrC) layer was formed (referred to below as chromized pins), and pins in which a vanadium carbide (VC) layer was formed on the surface of the pin material (referred to below as VC pins), and the results for the wear resistance of the pins were as follows.

In the case of chromized pins, peeling occurred at the surface of the chromium carbide layer in a state of usage in which a high surface pressure was repeatedly applied, and wear of the pins progressed as the peeling progressed. Furthermore, in the case of VC pins, peeling occurred at the interface between the vanadium carbide layer and the parent material (pin material) when a high surface pressure was applied, and the whole of the vanadium carbide layer constituting the hardened layer peeled altogether; as a result, wear sharply progressed. It was confirmed from this that although chromium carbide provides good adhesion (bonding) with the parent material, the surface pressure strength is low; vanadium carbide, on the other hand, has high surface pressure strength because peeling did not readily occur from the surface thereof, but adhesion with the parent material is low.

A means such as that described in JP 2003-269550 A has been proposed in which a carbide layer comprising vanadium carbide as the main component and a small amount of chromium carbide is formed on the outermost surface part of steel forming the parent material of a pin, and a boundary layer in which the vanadium carbide content sharply decreases and the chromium carbide content sharply increases is formed at the boundary region between the carbide layer and the parent material.

In this case, by forming a carbide layer comprising vanadium carbide, which has high surface pressure strength, as the main component on the outermost surface part of the parent material, surface peeling of the carbide layer is unlikely to occur even under a high surface pressure, so the wear resistance of the pin is improved. Moreover, a chromium-rich layer comprising a relatively large amount of chromium carbide which has a high level of bonding (adhesion) with the parent material and vanadium carbide is formed at the boundary layer between the carbide layer and the parent material, and as a result peeling of the carbide layer from the parent material is unlikely to occur even under a high surface pressure, so the wear resistance of the pin is further improved.

SUMMARY OF THE INVENTION

Problem to be Solved by the Invention

According to the means described in abovementioned JP 2003-269550 A, a certain effect can be anticipated against mechanical wear of the pins which is produced as a result of the links rotating and sliding about the pins.

However, subsequent testing showed that the carbon atoms in the vanadium carbide are oxidized by chemical attack from degraded oil. There is consequently a risk that when oil is used for a long period of time, wear (corrosive wear) of the pins will be promoted by degraded oil.

The present invention has been devised in view of the conventional situation outlined above, and the problem to be solved by the present invention lies in providing a chain pin whereof the wear resistance can be improved even in an environment in which degraded oil is used.

Means for Solving the Problem

In order to solve abovementioned problem, the inventors of this application focused on tungsten carbide (WC) as a carbide having high hardness and high robustness against oxidation. A WC layer is expected to reduce pin wear from chemical attack or soot attack in the environment of usage inside a turbo engine or a direct-injection engine. At the same time, tungsten itself generally has a high melting point, and does not readily form directly on the surface of steel.

The present invention has been devised in view of this situation, and the chain pin according to the present invention is such that a carbide layer comprising chromium carbide is formed on the outermost surface part of the steel forming the parent material of the pin, and tungsten carbide is diffused in said carbide layer (see claim 1).

According to the present invention, tungsten carbide is formed in the carbide layer on the outermost surface part of the steel, which means that the high hardness of the steel surface can be maintained while high robustness against chemical attack and soot attack from degraded oil can be demonstrated by the tungsten carbide in the carbide layer; as a result the wear resistance can be improved.

Furthermore, tungsten carbide is diffused in the carbide layer comprising chromium carbide, and as a result it is possible to incorporate tungsten carbide which does not readily form directly on the surface of steel into the chromium carbide layer with the chromium carbide serving as a binder.

The thickness of the carbide layer is preferably at least 10 μm (see claim 2).

According to the inventive method for producing a chain pin, a steel material forming the parent material of the pin is introduced into a vessel together with chromium, tungsten carbide and a halide catalyst, and stirring is performed inside the vessel under a temperature of 750-950° C. in order to form a diffusion coating on the steel material, whereby a chromium carbide layer in which tungsten carbide is diffused is formed on the outermost surface part of the steel material (see claim 3).

In this case, the lower limit of the temperature range for the diffusion coating is set at 750° C. because it is difficult to form a chromium carbide (CrC) layer if the temperature is lower than this, and the upper limit of the temperature range is set at 950° C. because it has been experimentally confirmed that it is difficult to form a tungsten carbide (WC) layer if the temperature is higher than this.

The halide serving as a catalyst is preferably iron chloride (see claim 4).

Advantage of the Invention

As described above, according to the present invention, a carbide layer comprising chromium carbide is formed on the outermost surface part of the steel forming the parent material of the pin and tungsten carbide is diffused in said carbide layer, and therefore the high hardness of the steel surface can be maintained, while high robustness against chemical attack and soot attack caused by degraded oil can be demonstrated by the tungsten carbide in the carbide layer; as a result the wear resistance can be improved. Furthermore, according to the present invention, tungsten carbide is diffused in the carbide layer comprising chromium carbide, and as a result it is possible to incorporate tungsten carbide which does not readily form directly on the surface of steel into the chromium carbide layer with the chromium carbide serving as a binder.

MODE OF EMBODIMENT OF THE INVENTION

An exemplary embodiment of the present invention will be described below with reference to the appended figures.

FIG. 1-8 illustrate the chain pin according to an exemplary embodiment of the present invention. The example of a pin for a silent chain is described herein.

Figure 1:
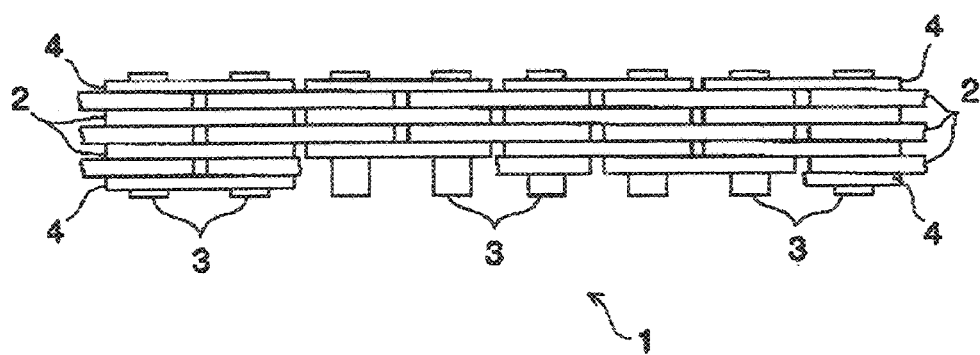
FIG. 1 A schematic diagram in plan view of a silent chain employing the pin according to an exemplary embodiment of the present invention.
Figure 2:
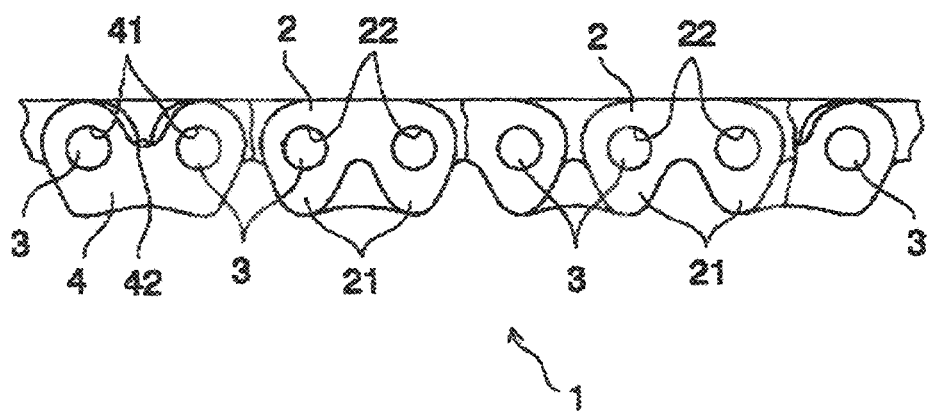
FIG. 2 A schematic diagram in front view of the silent chain (FIG. 1).

As shown in FIGS. 1 and 2, a silent chain 1 is constructed by stacking a large number of link plates 2 each having a pair of tooth parts 21 and a pair of pinholes 22 in the thickness direction (the vertical direction in FIG. 1, the direction perpendicular to the page in FIG. 2) and the lengthwise direction (the left-right direction in FIGS. 1 and 2), while also pivotably and endlessly linking the link plates 2 using linking pins 3 which are inserted into the pinholes 22. Guide links 4 are provided on the outermost side of the link plates 2, and the ends of the linking pins 3 are fixed inside pinholes 41 in the guide links 4. It should be noted that what are known as low-rigidity guides in which a crotch part 42 is formed on the back surface side are used here as an example of guide links.

Figure 3:
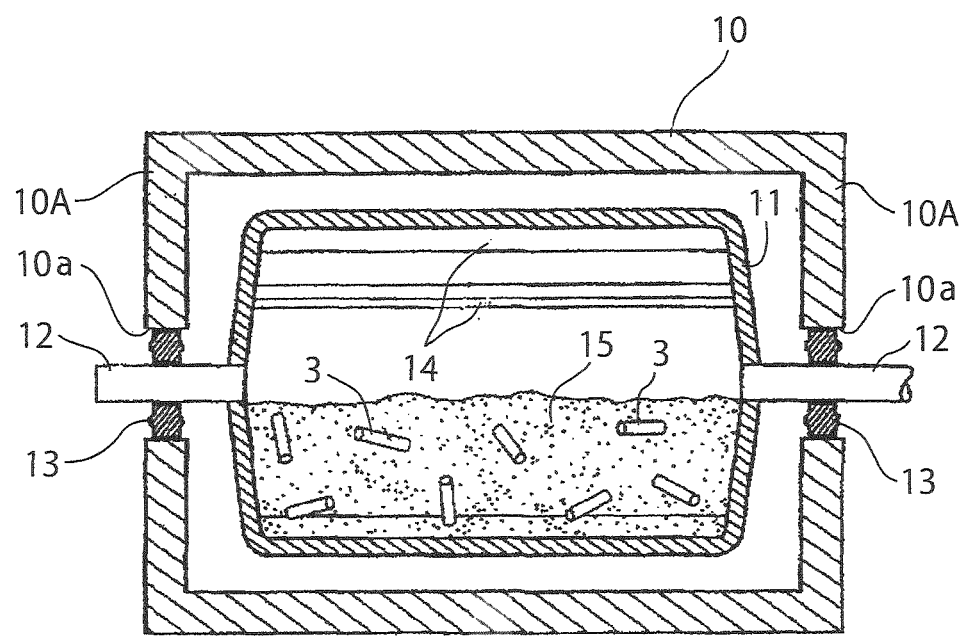
FIG. 3 A view in longitudinal section of a rotary retort which is the apparatus for producing a pin (FIG. 1).
Figure 4:
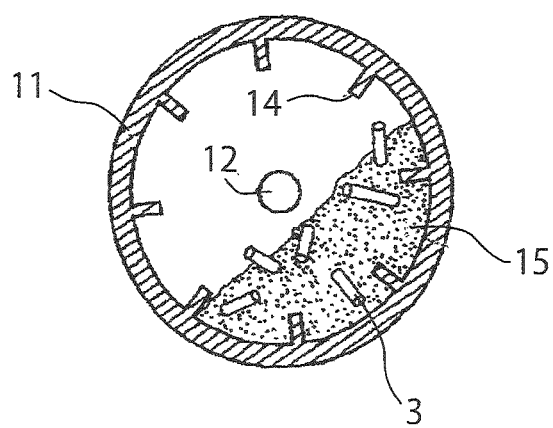
FIG. 4 An end view in cross section of the rotary retort (FIG. 3).

The linking pins 3 are produced using a production apparatus such as that shown in FIG. 3 and FIG. 4. In the figures, a rotary vessel (rotary retort) 11 is rotatably provided inside a furnace 10. Spindles 12 are provided at both ends of the rotary retort 11, the spindles 12 running through openings 10a formed in both side wall parts 10A of the furnace 10. Bushes 13 are provided in the openings 10a, and the spindles 12 of the rotary retort 11 are rotatably supported by the bushes 13 and tightly sealed therewith. The spindles 12 are drive-linked to a drive motor which is not depicted. Furthermore, a plurality of radial protrusions 14 are provided inside the rotary retort 11.

The method for producing the linking pins 3 employing the abovementioned production apparatus will be described next.

The rotary retort 11 is rotated at a predetermined speed by means of the drive motor, while heating in the furnace 10 is maintained at a temperature of 750-950° C. (preferably about 890° C.). At this point, a large number of linking pins 3 made of carbon steel to be coated and a particle mixture 15 are introduced into the rotary retort 11. The particle mixture 15 includes a penetrant comprising chromium (Cr) powder and tungsten carbide (WC) powder, and a halide (iron chloride $FeCl_3$ in this case) catalyst. An operating time of the order of 30 hours is preferred, but this operating time is adjusted in accordance with the thickness of the carbide layer to be formed on the surface of the pins.

When the rotary retort 11 is rotated during operation, the particle mixture 15 is mixed and agitated together with the linking pins 3 by the radial protrusions 14 inside the rotary retort 11, as shown in FIG. 4, and as a result the outer periphery of the linking pins 3 is placed in a state of constant contact with the particle mixture 15. This causes the tungsten carbide (WC) particles to penetrate the surface of the steel forming the parent material of the linking pins 3 together with chromium carbide (CrC), and a chromium carbide layer in which tungsten carbide particles are diffused in a chromium carbide (CrC) layer (CrC—WC layer) is formed.

In this case, the lower limit of the temperature range is set at 750° C. because it is difficult to form a chromium carbide (CrC) layer if the temperature is lower than this, and the upper limit of the temperature range is set at 950° C. because it has been experimentally confirmed that it is difficult to form a WC layer if the temperature is higher than this (a WC layer is no longer formed when the temperature exceeds 1000° C. in particular).

Figure 5:
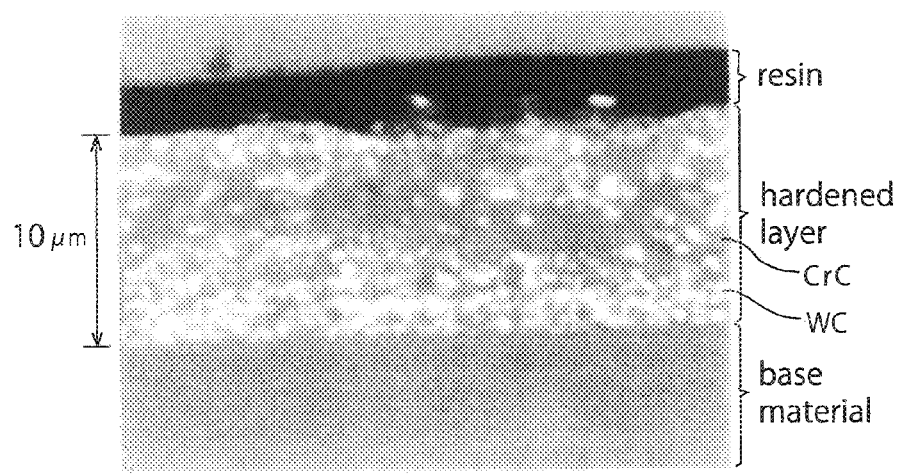
FIG. 5 A microscope photograph of the pin (FIG. 1) in transverse section.

Next, FIG. 5 shows a microscope photograph in transverse section of the linking pin 3 produced in the manner described above.

As shown in FIG. 5, a hardened layer having a thickness of about 10 μm is formed on the surface of the parent material of the linking pin 3. The region of the hardened layer which appears gray is the chromium carbide (CrC) layer, and the region which appears white is tungsten carbide (WC). As can be seen in the figure, a large number of tungsten carbide (WC) particles are diffused in the chromium carbide (CrC) layer. It should be noted that the layer of resin provided over the hardened layer is used to fix the cut sample of the linking pin 3 in order to capture the microscope photograph.

The method for testing wear using the abovementioned silent chain will be described next.

Figure 6:
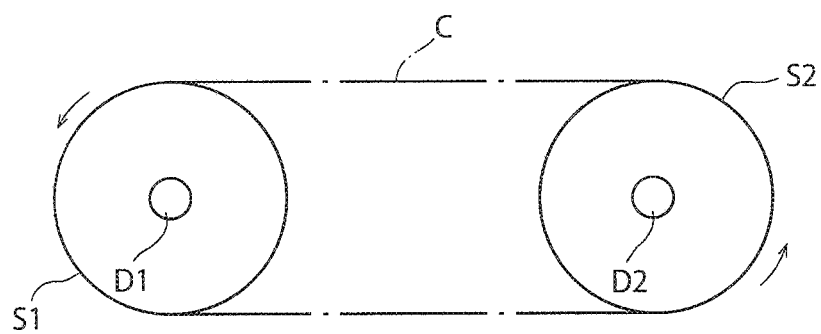
FIG. 6 A schematic diagram of a wear testing apparatus for the silent chain (FIG. 1) together with the test conditions.

The wear test was carried out using the wear testing apparatus shown in FIG. 6, the schematic structure being shown together with the test conditions. As shown in the figure, the testing apparatus is constructed by fitting 23-tooth sprockets S1, S2 to a drive shaft D1 and a driven shaft D2 disposed with a gap therebetween, and a silent chain C for testing is wound onto the sprockets S1, S2.

The rotation speed of the drive shaft D1 of the wear testing apparatus was 6500 rpm. The lubricating oil temperature was 100° C. and the amount of oil was 1.0 liters/minute. Furthermore, the lubricating oil which was used had a total base number (TBN) of 1. Here, the total base number generally indicates the amount of acid and base contained in oil, and is used as a reference to indicate the acid neutralizing capacity and cleanliness of oil.

Oil which has been degraded by long-term use tends to become acidic and the total base number thereof decreases, and therefore selecting lubricating oil in which TBN=1 is intended to replicate a state of operating with degraded oil.

Figure 7:
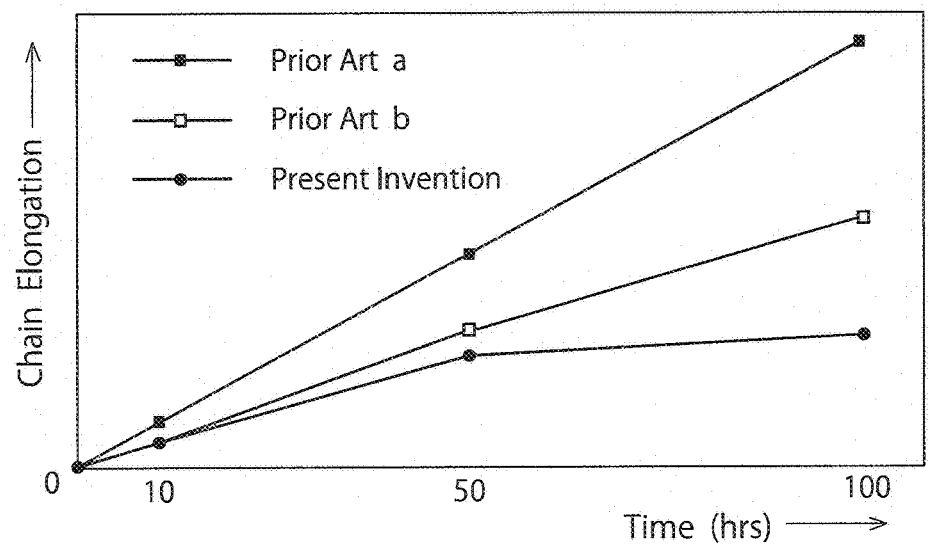
FIG. 7 A graph showing the results of wear resistance testing performed using the wear resistance apparatus (FIG. 6) together with the results for conventional articles.
Figure 8:
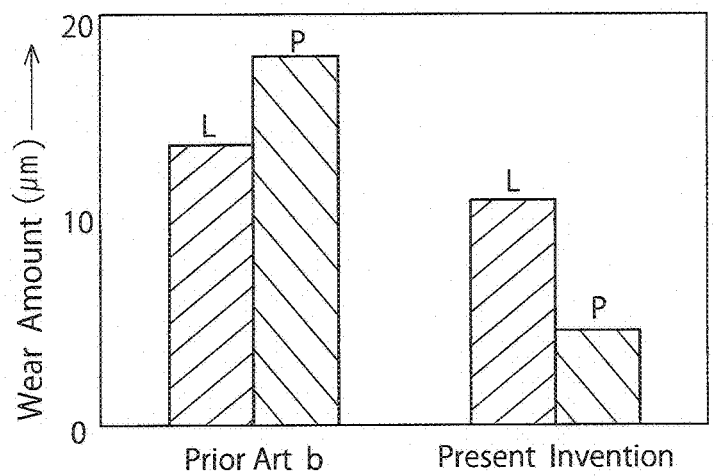
FIG. 8 A graph showing the amount of wear of links and pins after wear resistance testing (after 100 hours) and the amount of wear of a conventional article.

The results of the wear test employing the abovementioned wear testing apparatus are shown in FIGS. 7 and 8.

In the figures, conventional article a indicates the example of a silent chain employing nitride pins which have been subjected to nitriding, and conventional article b indicates the example of a silent chain employing VC pins which have been coated with a vanadium carbide (VC) layer. The surface hardness of the pins of conventional article a was Hv=800 and the thickness of the hardened layer was 40 μm, the surface hardness of the pins of conventional article b was Hv=2500 and the thickness of the hardened layer was 15 μm, and the surface hardness of the pins of the inventive article was Hv=1700 and the thickness of the hardened layer was 15 μm. Furthermore, FIG. 8 shows a comparison of the amount of wear of the links L and pins P as separate entities in the inventive article, and the amount of wear of the links L and pins P as separate entities in conventional article b after an operating time of 100 hours.

As shown in FIG. 7, when the operating time was around 10 hours, there was hardly any difference in chain elongation between conventional articles a and b and the inventive article, but after this a gradual difference in chain elongation appeared between the articles. When the operating time exceeded 50 hours in particular, there was essentially no increase in chain elongation in the inventive article, whereas chain elongation in the conventional articles a and b increased with time.

As shown in FIG. 8, the amount of wear of the links L after an operating time of 100 hours was about 21% less in the inventive article than in conventional article b, and the amount of wear of the pins P in the inventive article was about one quarter that of the conventional article b, which is clearly a considerable reduction.

According to this exemplary embodiment, a chromium carbide layer in which tungsten carbide (WC) particles are diffused in a chromium carbide (CrC) layer (CrC—WC layer) is formed on the surface of the steel forming the parent material of the linking pins 3, so it is possible to reduce wear of the pins and therefore of the chain as a whole even in an environment in which degraded oil is used.

The abovementioned exemplary embodiment used the example of a rotary vessel (rotary retort) as the vessel into which the pins and particle mixture are introduced in the pin production apparatus, but the present invention is not limited to the use of such a vessel. A rocking-type or agitation-type vessel, among others, may equally be used as the vessel into which the pins and particle mixture are introduced, rather than a rotary vessel.

The abovementioned exemplary embodiment described an example in which the pins according to the present invention were used in a silent chain, but the present invention may also be applied in the same way to pins for a roller chain.

FIELD OF INDUSTRIAL APPLICATION

The present invention is suitable for pins for linking adjacent links in power transmission chains such as silent chains or roller chains, and primary drive chains.

KEY TO SYMBOLS

1: Silent chain
3: Linking pin

PRIOR ART DOCUMENTS

Patent Documents

Patent Document 1 JP 56-41370 A (see the claims)
Patent Document 2 JP 10-169723 A (see paragraph [0022])
Patent Document 3 JP 2003-269550 A (see FIGS. 8 and 9)

The invention claimed is:

1. A method for producing a wear-resistant chain pin, wherein a steel material forming the parent material of the pin is introduced into a vessel together with chromium, tungsten carbide and a halide catalyst, and stirring is performed inside the vessel under a temperature of 750-950° C. in order to form a diffusion coating on the steel material, whereby a chromium carbide layer in which tungsten carbide is diffused is formed on the outermost surface part of the steel material.

2. The method for producing a chain pin as claimed in claim 1, wherein the halide is iron chloride.

* * * * *